(12) United States Patent
Guerriero et al.

(10) Patent No.: US 10,961,942 B2
(45) Date of Patent: Mar. 30, 2021

(54) SYSTEM AND METHOD FOR DETERMINING THE TIMING OF AN ENGINE EVENT

(71) Applicant: AI ALPINE US BIDCO INC, Wilmington, DE (US)

(72) Inventors: Marco Guerriero, Cohoes, NY (US); Jeffrey Jacob Bizub, Milwaukee, WI (US); Brett Alexander Matthews, Albany, NY (US)

(73) Assignee: AI ALPINE US BIDCO INC, Wilmington, DE (US)

( * ) Notice: Subject to any disclaimer, the term of this patent is extended or adjusted under 35 U.S.C. 154(b) by 91 days.

(21) Appl. No.: 16/329,695

(22) PCT Filed: Aug. 31, 2016

(86) PCT No.: PCT/US2016/049694
§ 371 (c)(1),
(2) Date: Feb. 28, 2019

(87) PCT Pub. No.: WO2018/044294
PCT Pub. Date: Mar. 8, 2018

(65) Prior Publication Data
US 2019/0195161 A1    Jun. 27, 2019

(51) Int. Cl.
*F02D 35/02* (2006.01)
*G01L 23/22* (2006.01)
(Continued)

(52) U.S. Cl.
CPC ......... *F02D 41/28* (2013.01); *F02D 13/0203* (2013.01); *F02D 35/024* (2013.01);
(Continued)

(58) Field of Classification Search
CPC .... F02D 35/024; F02D 35/027; F02D 35/028; F02D 41/28; F02D 41/0052;
(Continued)

(56) References Cited

U.S. PATENT DOCUMENTS

| | | |
|---|---|---|
| 5,400,648 A | 3/1995 | Mahr |
| 5,535,722 A | 7/1996 | Graessley et al. |

(Continued)

FOREIGN PATENT DOCUMENTS

| | | |
|---|---|---|
| DE | 10233611 A1 | 2/2004 |
| GB | 2442751 A | 4/2008 |
| WO | 2011011868 A1 | 2/2011 |

OTHER PUBLICATIONS

A PCT Search Report and Written Opinion issued in connection with corresponding Application No. PCT/US2016/049694 dated May 15, 2017.

(Continued)

*Primary Examiner* — Phutthiwat Wongwian
*Assistant Examiner* — Arnold Castro
(74) *Attorney, Agent, or Firm* — Fletcher Yoder, P.C.

(57) ABSTRACT

Systems and methods for estimating an engine event location are disclosed herein. In one embodiment, a control system is configured to receive feedback from at least one knock sensor coupled to a reciprocating engine, estimate an engine parameter based at least on the feedback and an Empirical Transform Function (ETF), estimate a location of an engine event based on the engine parameter, and adjust operation of the reciprocating engine based at least on the location of the engine event.

20 Claims, 5 Drawing Sheets

(51) Int. Cl.
*F02D 41/28* (2006.01)
*F02D 13/02* (2006.01)
*F02D 41/00* (2006.01)
*F02P 5/04* (2006.01)
*F02P 5/15* (2006.01)

(52) U.S. Cl.
CPC ......... *F02D 35/027* (2013.01); *F02D 35/028* (2013.01); *F02D 41/0052* (2013.01); *F02P 5/045* (2013.01); *F02P 5/1502* (2013.01); *G01L 23/221* (2013.01); *G01L 23/227* (2013.01); *F02D 2041/288* (2013.01); *F02D 2200/024* (2013.01)

(58) Field of Classification Search
CPC ........... F02D 13/0203; F02D 2200/024; F02D 2041/288; G01L 23/227; G01L 23/221; F02P 5/045; F02P 5/1502
See application file for complete search history.

(56) References Cited

U.S. PATENT DOCUMENTS

| | | | |
|---|---|---|---|
| 5,763,769 A | 6/1998 | Kluzner | |
| 7,295,916 B2 | 11/2007 | Sauler et al. | |
| 8,342,011 B2 | 1/2013 | Galtier et al. | |
| 8,396,649 B2 | 3/2013 | Huang | |
| 8,429,955 B2 | 4/2013 | Taglialatela et al. | |
| 8,849,549 B2 | 9/2014 | Jin et al. | |
| 8,949,006 B2* | 2/2015 | Matsushima | F02D 35/027 701/111 |
| 9,695,761 B2* | 7/2017 | Bizub | F02D 35/02 |
| 10,054,043 B2* | 8/2018 | Matthews | F02D 35/027 |
| 10,323,618 B1* | 6/2019 | Dudar | F02P 5/1526 |
| 2004/0267430 A1 | 12/2004 | Ancimer | |
| 2009/0277247 A1* | 11/2009 | Hagari | F02P 5/152 73/35.04 |
| 2010/0168991 A1* | 7/2010 | Hamama | F02D 41/222 701/111 |
| 2010/0174472 A1* | 7/2010 | Matsushima | F02P 5/152 701/111 |
| 2011/0118960 A1* | 5/2011 | Komatsu | G01M 15/04 701/111 |
| 2011/0132327 A1* | 6/2011 | Aso | F01L 1/267 123/436 |
| 2011/0178750 A1* | 7/2011 | Kitamura | G01R 23/16 702/76 |
| 2011/0180041 A1* | 7/2011 | Falkowski | F02D 41/0025 123/478 |
| 2011/0276293 A1* | 11/2011 | Kitamura | F02D 35/027 702/76 |
| 2012/0192835 A1* | 8/2012 | Matsushima | F02P 5/152 123/436 |
| 2013/0061833 A1* | 3/2013 | Falkowski | F02B 15/00 123/575 |
| 2013/0151122 A1 | 6/2013 | Jin et al. | |
| 2014/0041439 A1* | 2/2014 | Matsushima | F02D 35/027 73/35.09 |
| 2015/0114088 A1 | 4/2015 | Fischer | |
| 2015/0120211 A1* | 4/2015 | Michaelis | G01N 33/22 702/22 |
| 2016/0195029 A1* | 7/2016 | Bizub | F02D 35/027 73/35.03 |
| 2016/0281617 A1* | 9/2016 | Batal | F02D 41/28 |
| 2017/0010173 A1* | 1/2017 | Bizub | F02D 41/22 |
| 2019/0128200 A1* | 5/2019 | Nagappa | F02D 35/024 |

OTHER PUBLICATIONS

Andersson et al., "Detection of Combustion Properties in a Diesel Engine using Block Mounted Accelerometers", Proceedings of the 19th World Congress, The International Federation of Automatic Control, Cape Town, South Africa, Aug. 24-29, 2014.

* cited by examiner

SYSTEM AND METHOD FOR DETERMINING THE TIMING OF AN ENGINE EVENT

BACKGROUND

The subject matter disclosed herein relates to systems and methods for estimating a location of an engine event in a combustion engine.

Combustion engines typically combust a carbonaceous fuel, such as natural gas, gasoline, diesel, and the like, and use the corresponding expansion of high temperature and pressure gases to apply a force to certain components of the engine (e.g., piston disposed in a cylinder) to move the components over a distance. Each cylinder may include one or more valves that open and close in conjunction with combustion of the carbonaceous fuel. For example, an intake valve may direct an oxidant such as air into the cylinder. A fuel mixes with the oxidant and combusts (e.g., ignition via a spark) to generate combustion fluids (e.g., hot gases), which then exit the cylinder via an exhaust valve. The location (e.g., a crank angle corresponding to an event or timing) of some engine events (e.g., peak firing pressure) may affect fuel economy, power, and other operational parameters. Unfortunately, existing techniques for determining the location of such events are expensive, complex, and/or utilize operator input related to a specific type of engine.

BRIEF DESCRIPTION

A summary of certain embodiments disclosed herein is set forth below. It should be understood that these aspects are presented merely to provide the reader with a brief summary of these embodiments and that these aspects are not intended to limit the scope of this disclosure. Indeed, this disclosure may encompass a variety of aspects that may not be set forth below.

In one embodiment, a control system is configured to receive feedback from at least one knock sensor coupled to a reciprocating engine, estimate an engine parameter based at least on the feedback and an Empirical Transform Function (ETF), estimate a location of an engine event based on the engine parameter, and adjust operation of the reciprocating engine based at least on the location of the engine event.

In another embodiment, a method for training a control system to estimate the location of peak firing pressure in a reciprocating engine includes receiving a plurality of knock signals from a knock sensor coupled to the reciprocating engine, receiving a plurality of engine parameter signals from a second sensor of the reciprocating engine, determining a plurality of Empirical Transfer Function Estimates (ETFEs), where a respective ETFE of the plurality of ETFEs is based at least on a Fourier transform of a respective knock signal of the plurality of knock signals and on a Fourier transform of a respective engine parameter signal of the plurality of engine parameter signals, and aggregating the plurality of ETFEs to generate an Empirical Transform Function (ETF).

In another embodiment, a system includes a reciprocating engine control system configured to receive a plurality of knock signals from a knock sensor coupled to the reciprocating engine, receive a plurality of engine parameter signals from a second sensor, determine a plurality of Empirical Transfer Function Estimates (ETFEs), where a respective ETFE of the plurality of ETFEs is based at least on a Fourier transform of a respective knock signal of the plurality of knock signals and on a Fourier transform of a respective engine parameter signal of the plurality of engine parameter signals, aggregate the plurality of ETFEs to generate an Empirical Transform Function (ETF), receive feedback from at least the knock sensor when the reciprocating engine operates to power a load, estimate an engine parameter based at least on the feedback and the ETF, estimate a location of an engine event corresponding based on the engine parameter, and adjust operation of the reciprocating engine based at least on the location of the engine event.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
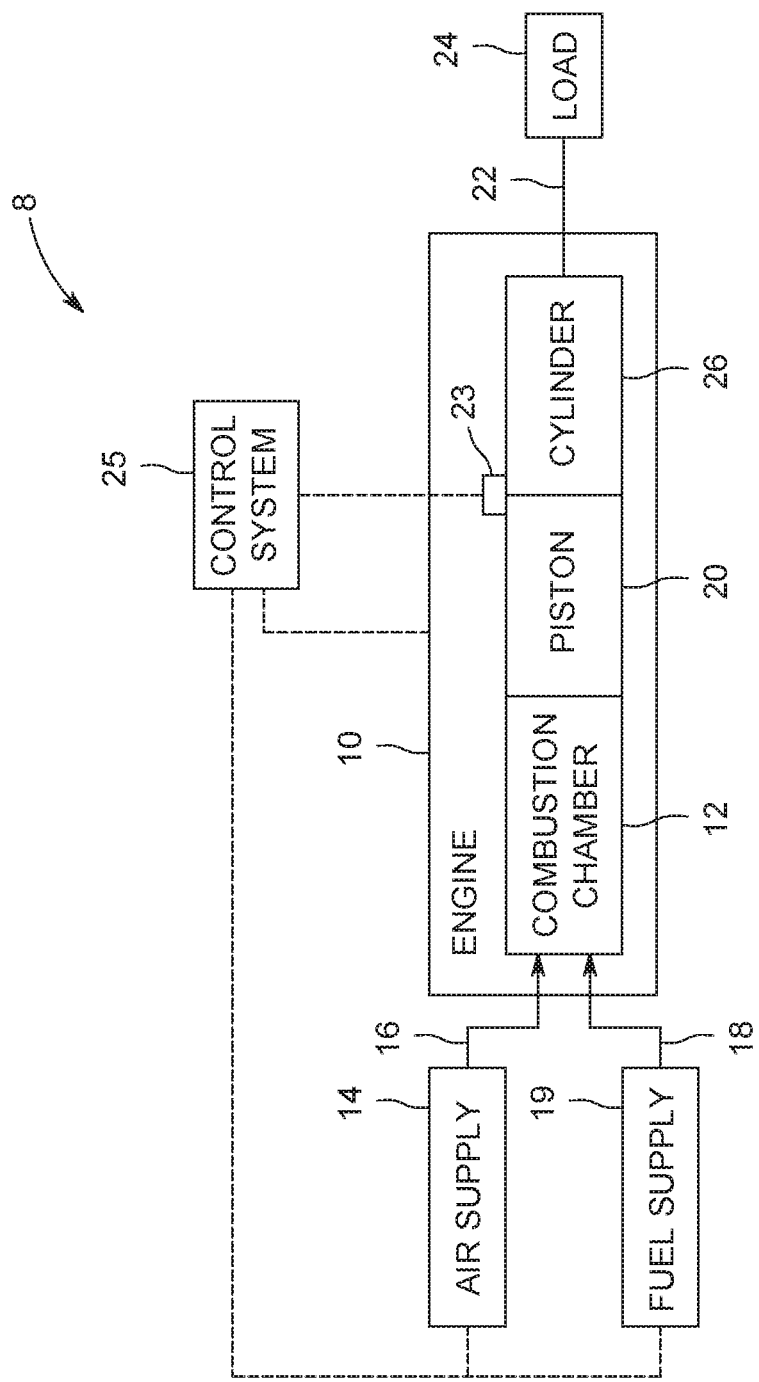
FIG. 1 is a block diagram of a portion of an engine driven power generation system having a reciprocating internal combustion engine, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The presently disclosed systems and methods relate to estimating a location (e.g., a crank angle corresponding to an event or timing) of an engine event (e.g., peak firing pressure) in a reciprocating, internal combustion engine using one or more sensors, such as a knock sensor. A knock sensor may include an acoustic or sound sensor, a vibration sensor, or any combination thereof. For example, the knock sensor may be a piezoelectric accelerometer, a microelectromechanical system (MEMS) sensor, a Hall effect sensor, a magnetostrictive sensor, and/or any other sensor designed to sense vibration, acceleration, acoustics, sound, and/or movement. The knock sensor may monitor acoustics and/or vibrations associated with combustion in the engine to detect a knock condition (e.g., combustion at an unexpected time not during a normal or expected window of time for combustion), or other engine events that may create acoustic and/or vibration signals. In other embodiments, the sensor may not be a knock sensor, but any sensor that may sense vibration, pressure, acceleration, deflection, or movement.

In certain instances, it may be desirable to accurately estimate the timing of various engine events (e.g., peak firing pressure) that are indicative of engine performance. Locating such events may enable a user or controller to adjust various engine parameters based on the timing of the engine event to optimize engine performance. However, existing techniques may utilize sensors (e.g., pressure sensors) positioned within an engine cylinder to locate such events, which may be significantly more expensive than knock sensors and may be more susceptible to damage (e.g., from exposure to relatively high temperatures and pressures). Additionally, some techniques that may be utilized to predict the engine event utilize operator inputs related to a specific type of engine and/or complex algorithms that are relatively time-consuming to perform. Therefore, it may be advantageous to train a control system of an engine to utilize a signal from a knock sensor to accurately predict the location (e.g., a crank angle corresponding to an event or timing) of an engine event using straightforward calculations that do not utilize engine-specific inputs. Such a system may reduce costs because the controller may accurately estimate the location (e.g., a crank angle corresponding to an event or timing) quickly and without operator inputs.

Because of the percussive nature of combustion engines, knock sensors may be capable of detecting signatures even when mounted on the exterior of an engine cylinder. However, the knock sensors may also be disposed at various locations in or about one or more cylinders. Knock sensors detect a condition of the engine (e.g., vibrations of the cylinder) and a control system may utilize a signal received from the knock sensor to estimate the location of an engine event. The present disclosure is related to systems and methods for determining a location (e.g., a crank angle corresponding to an event or timing) of an engine event (e.g., peak firing pressure) by assuming a relationship between a knock signal and a signal indicative of another engine parameter (e.g., cylinder pressure) received from another sensor (e.g., a pressure sensor disposed in the engine cylinder). Such an assumption may enable a control system to utilize experimental data to form an algorithm configured to estimate locations of an engine event by performing relatively simple calculations. The trained control system may then receive feedback from a knock sensor (e.g., a vibrational profile) and predict a location of an engine event when the engine operates under a load.

Turning to the drawings, FIG. 1 illustrates a block diagram of an embodiment of a portion of an engine driven power generation system having a reciprocating internal combustion engine. The reciprocating internal combustion engine may experience an engine event (e.g., peak firing pressure) and the location of the engine event may be estimated using the presently disclosed system and methods. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An oxidant supply 14 (e.g., an air supply) is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26, which converts pressure exerted by the gases into a rotating motion, thereby causing a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example. The fuel 18 may also include a variety of liquid fuels, such as gasoline or diesel fuel.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders 26 (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders 26 and/or the pistons 20 may have a diameter of between approximately 10-40 cm, 15-25 cm, or may be about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may sense vibrations, acoustics, or sound caused by combustion in the engine 10, such as vibrations, acoustics, or sound due to detonation, pre-ignition, and/or pinging. The knock sensor 23 may also sense vibrations, acoustics, or sound caused by intake or exhaust valve closures. Therefore, the knock sensor 23 may include an acoustic or sound sensor, a vibration sensor, or a combination thereof. For example, the knock sensor 23 may include a piezoelectric vibration sensor. The knock sensor 23 is shown communicatively coupled to a control system 25 (e.g., a controller or an engine control unit "ECU"). During operations, a knock signal from the knock sensor 23 is communicated to the control system 25 to determine if knocking conditions (e.g., pinging) exist and/or provide other information related to operating conditions of the engine 10. Accordingly, the control system 25 may adjust operating parameters of the engine 10 based on the knock signal to enhance engine performance. For example, the control system 25 may adjust an engine timing map of the engine 10, an oxidant/fuel ratio of the engine 10, a flow of exhaust recirculation gas of the engine 10, a position of an intake or exhaust valve, or another operating parameter of the engine 10.

Figure 2:
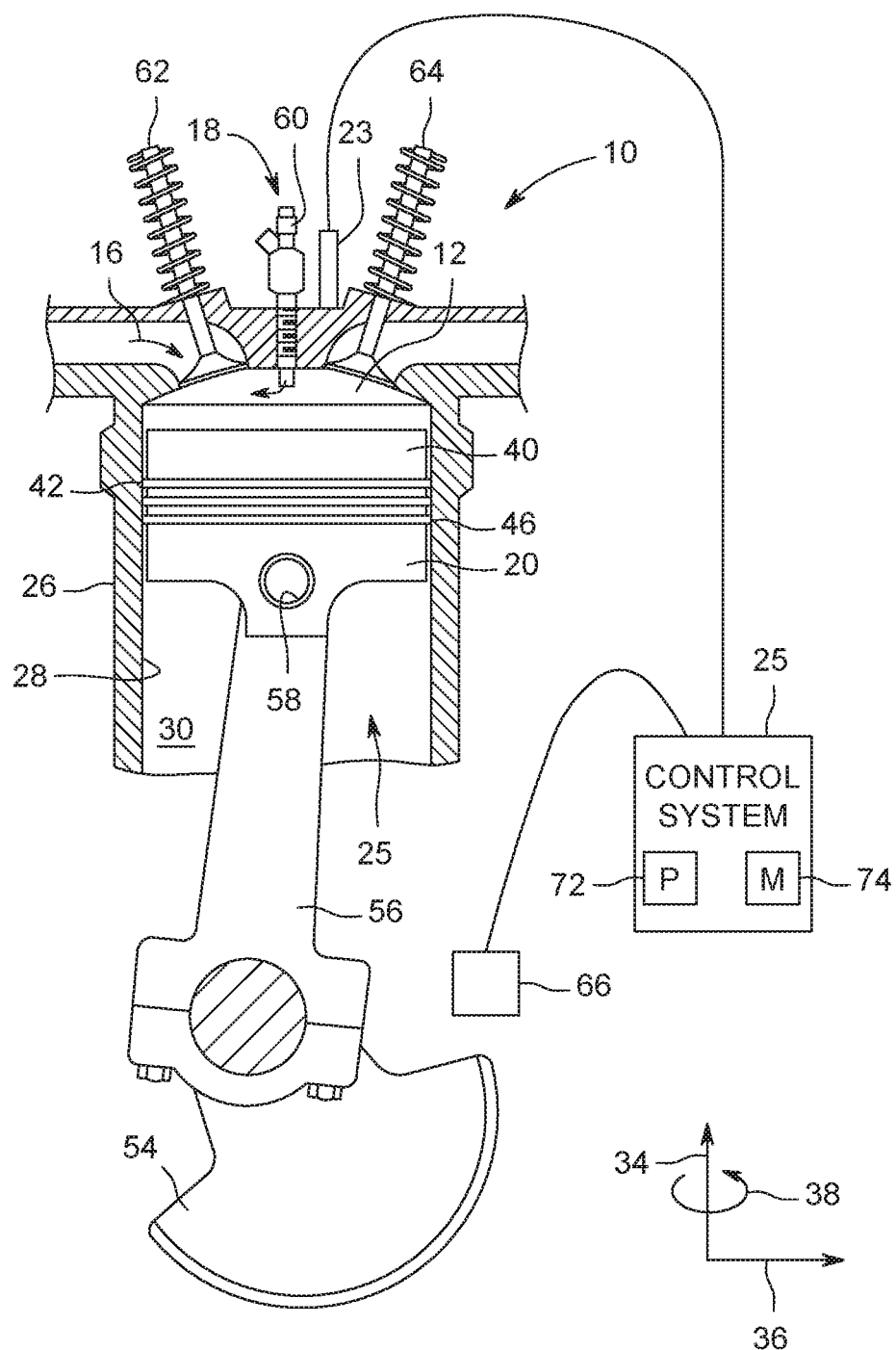
FIG. 2 is a cross-sectional side view of a piston-cylinder assembly having a piston disposed within a cylinder of the reciprocating engine of FIG. 1, in accordance with aspects of the present disclosure.

FIG. 2 is a cross-sectional side view of an embodiment of a piston-cylinder assembly having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of oxidant (e.g., air 16) to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the oxidant 16 in the combustion chamber 12 may cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from TDC to BDC or from BDC to TDC, the crankshaft 54 rotates one half of a revolution. Each movement of the piston 20 from TDC to BDC or from BDC to TDC is called a stroke, and engine 10 embodiments may include two-stroke engines, three-stroke engines, four-stroke engines, five-stroke engines, six-stroke engines, or more.

During engine 10 operations, a sequence including an intake process, a compression process, a power process, and an exhaust process typically occurs. The intake process enables a combustible mixture, such as fuel 18 and oxidant 16 (e.g., air), to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then urges the piston 20 to BDC. The exhaust process typically returns the piston 20 to TDC, while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 may include a crankshaft sensor 66, knock sensor 23, and the control system 25, which includes a processor 72 and memory unit 74. The crankshaft sensor 66 senses the position (e.g., location) and/or rotational speed of the crankshaft 54. Accordingly, a crank angle or crank timing information may be derived. That is, when monitoring combustion engines, timing is frequently expressed in terms of crankshaft angle. For example, a full cycle of a four stroke engine 10 may be measured as a 720° cycle. The knock sensor 23 may be a piezoelectric accelerometer, a microelectromechanical system (MEMS) sensor, a Hall effect sensor, a magnetostrictive sensor, and/or any other sensor designed to sense vibration, acceleration, acoustics, sound, and/or movement. In other embodiments, the sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder may include one or more knock sensors 23. The crankshaft sensor 66 and the knock sensor 23 are shown in electronic communication with the control system 25 (e.g., a controller or an engine control unit "ECU"). The control system 25 may include non-transitory code or instructions stored in a machine-readable medium (e.g., the memory unit 74) and used by a processor (e.g., the processor 72) to implement the techniques disclosed herein. The memory may store computer instructions that may be executed by the processor 72. Additionally, the memory may store look-up tables and/or other relevant data. The control system 25 monitors and controls the operation of the engine 10, for example, by adjusting ignition timing, timing of opening/closing valves 62 and 64, adjusting the delivery of fuel and oxidant (e.g., air), and so on.

In certain embodiments, other sensors may also be included in the system 8 and coupled to the control system 25. For example, the sensors may include atmospheric and engine sensors, such as pressure sensors, temperature sensors, speed sensors, and so forth. For example, the sensors may include knock sensors, crankshaft sensors, oxygen or lambda sensors, engine air intake temperature sensors, engine air intake pressure sensors, jacket water temperature sensors, engine exhaust temperature sensors, engine exhaust pressure sensors, and exhaust gas composition sensors. Other sensors may also include compressor inlet and outlet sensors for temperature and pressure.

During the power process of engine operation, a force (e.g., a pressure force) is exerted on the piston 20 by the expanding combustion gases. The maximum force exerted on the piston 20 is described as the peak firing pressure ("PFP"). It may be desirable that the PFP occur a few crank angle degrees after the piston 20 has reached TDC so that the maximum amount of force may be exerted on the piston 20. Therefore, having the ability to estimate the location (e.g., timing or crank angle) of PFP using the knock sensor 23 is desirable because the location of PFP may be compared to the location of TDC to assess whether the engine 10 is operating at an optimal efficiency. Moreover, if the timing of PFP is not at an optimal level, various engine parameters (e.g., ignition timing, fuel/air ratio, intake or exhaust valve closure timing, etc.) may be adjusted to enhance engine performance. For example, the control system 25 may adjust an engine timing map of the engine 10, an oxidant/fuel ratio, a flow of exhaust recirculation gas, a position of the intake 62 or exhaust valve 64, or another operating parameter of the engine 10.

Additionally, it may also be desirable to estimate a location (e.g., a crank angle corresponding to an event or timing) of other engine events. For example, estimating the location of the exhaust valve 64 closure may enable a user or the control system 25 to determine whether the exhaust valve 64 is working properly or whether it is stuck in an open position or a closed position. Keeping the exhaust valve 64 open for a certain amount of time may enhance engine efficiency. While the present disclosure mainly focuses on estimating the location of PFP during engine operation, it should be noted that the disclosed systems and methods may be used to estimate a location of other engine events (e.g., closure of the exhaust valve 64).

The present disclosure relates to predicting a timing of an engine event (e.g., PFP) using a knock signal from the knock sensor 23. In certain embodiments, the control system 25 is trained (e.g., via machine learning) to utilize a knock signal to estimate a location (e.g., a crank angle corresponding to an event or timing) of a desired engine event.

Figure 3:
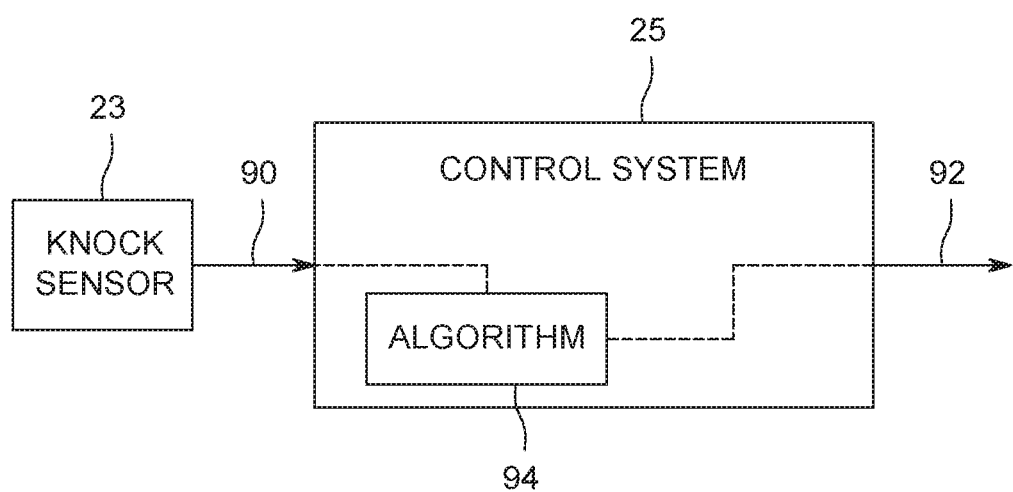
FIG. 3 is a schematic of a control system that may be utilized to estimate a location of an engine event in the engine of FIG. 1, in accordance with aspects of the present disclosure.

FIG. 3 is a schematic showing the control system 25 that may be utilized to determine a location of an engine event (e.g., PFP). As shown in the illustrated embodiment of FIG. 3, the control system 25 may be configured to receive an input 90, which may be received from the knock sensor 23. In other embodiments, the input 90 may be received from the knock sensor 23, the crankshaft sensor 66, another sensor, or a combination thereof. The control system 25 may process the input 90 and generate an output 92. For example, the output 92 may be a pressure signal, which may enable the control system 25 to estimate a location of the PFP. Accordingly, the control system 25 may utilize the output 92 and/or the estimated PFP location to generate a signal that may adjust an operating parameter of the engine 10, thereby increasing an efficiency of the engine 10. For example, in some embodiments, the control system 25 may send the signal to an engine component to adjust an engine timing map of the engine 10, an oxidant/fuel ratio, a flow of exhaust recirculation gas, a position of the intake 62 or exhaust valve 64, or another operating parameter of the engine 10 based on the estimate of the engine event location.

The control system 25 may undergo a training process that enables the control system 25 to develop or parameterize an algorithm 94 (e.g., a transfer function), which processes the input 90 and generates the output 92. The control system 25 may develop the algorithm 94 based on experimental data (e.g., data collected over a plurality of engine cycles under a variety of operating conditions of the engine 10) indicative of both the input 90 (e.g., a knock signal) and the output 92 (e.g., a pressure signal). In some embodiments, the control system 25 may be configured to generate the algorithm 94 by assuming a relationship between the input 90 and the output 92. For example, the control system 25 may assume a linear relationship between the input 90 (e.g., a knock signal) and the output 92 (e.g., a pressure signal). Parameters of the relationship may then be defined or updated by the training process. In some embodiments, the linear relationship may be independent of time. In other embodiments, the linear relationship may be time dependent. In still further embodiments, the relationship between the input 90 and the output 92 may be any suitable relationship (e.g., non-linear relationships). In any event, the control system 25 may determine an empirical transfer function estimate ("ETFE") by applying the assumed relationship to the experimental data indicative of the input 90 and the output 92. For example, in embodiments that use a linear relationship assumption, the ETFE may be determined by Equation 1.

$$\hat{G}(w) = \frac{Y(w)}{U(w)} \quad \text{Equation 1}$$

In Equation 1, $\hat{G}(w)$ represents the ETFE, $Y(w)$ is the Fourier transform of the output 92, and $U(w)$ is the Fourier transform of the input 90. Alternatively, $Y(w)$ may be the fast Fourier transform ("FFT") of the output 92 over a window surrounding a known engine event location and $U(w)$ may be the FFT of the input 90 over the window surrounding the known engine event location.

The ETFE may be determined over a plurality of cycles, and each cycle of the plurality of cycles may correspond to operation of the engine 10 under different conditions (e.g., normal load, reduced load, or increased load). Thus, the control system 25 may be configured to aggregate multiple ETFEs to determine an empirical transfer function ("ETF"), which in some embodiments may be the algorithm 94. The ETF may be determined from the ETFEs using one or more aggregation techniques. In some embodiments, the control system 25 may utilize an arithmetic mean aggregation technique, as shown in Equation 2.

$$G_{ARI}(w) = \frac{1}{M} \sum_{m=1}^{M} \hat{G}_M(w) \quad \text{Equation 2}$$

Accordingly, in embodiments that utilize the arithmetic mean aggregation technique, the ETF (e.g., $G_{ARI}(w)$) may be an average of each of the ETFEs. In Equation 2, "M" represents the total number of cycles and/or the total number of inputs 90, outputs 92, and ETFEs. Additionally, "m" represents a respective input 90, a respective output 92, and/or a respective ETFE. Accordingly, the sum of all of the ETFEs are divided by the total number of ETFEs (i.e., an arithmetic mean). In other embodiments, the ETF may be determined using a logarithmic mean aggregation technique, as shown in Equation 3.

$$G_{LOG}(w) = \exp\left(\frac{1}{M} \sum_{m=1}^{M} \ln\left(\frac{Y_m(w)}{U_m(w)}\right)\right) \quad \text{Equation 3}$$

In the embodiments that utilize the logarithmic mean aggregation technique, the ETF (e.g., $G_{LOG}(w)$) may be a logarithmic average (e.g., an average performed on a logarithmic scale) of each of the ETFEs. In still further embodiments, the ETF may be determined using a quotient aggregation technique, as shown in Equation 4.

$$G_{QUO}(w) = \frac{\frac{1}{M}\sum_{m=1}^{M} Y_m(w)U_m(w)}{\frac{1}{M}\sum_{m=1}^{M} U_m(w)U_m(w)}$$ Equation 4

In the embodiments that utilize the quotient aggregation technique, the ETF (e.g., $G_{QUO}(w)$) may be determined by dividing an average cross-spectrum by an average input spectrum. For example, the cross-spectrum may be the product of the input 90 and the output 92 (e.g., the experimental data indicative of the input 90 and the output 92). Additionally, the input spectrum may be the product of the input 90 with itself (e.g., the input 90 squared). In other embodiments, the ETF may be determined using a minimum aggregation technique, as shown in Equation 5.

$$G_{MIN}(w) = \hat{G}_{argmin|\hat{G}_m(w)|}$$ Equation 5

In the embodiments that utilize the minimum aggregation technique, the ETF (e.g., $G_{MIN}(w)$) may be determined by finding a minimum of the absolute value of the ETFEs over a window surrounding a known engine event location. The minimum of the absolute value of the ETFEs over such window may indicate when the engine event first occurs or begins. Therefore, the control system 25 may utilize the ETF to determine a combination of the input 90 and the output 92 indicative of when the engine event begins. It should be noted that the control system 25 may be configured to utilize any suitable aggregation technique to determine the ETF. Additionally, the control system 25 may perform any combination of aggregation techniques to generate the ETF.

Regardless of which aggregation technique and/or combination of aggregation techniques is utilized to determine the ETF, the control system 25 may utilize the ETF to estimate a location of the engine event during ordinary operation of the engine 10 (e.g., when the engine 10 is operating to power a load). For example, the control system 25 may receive a knock signal from the knock sensor 23. The control system 25 may then utilize the ETF to estimate an operating parameter of the engine 10 associated with the engine event (e.g., the output 92 or a pressure when the engine event is the PFP). In some embodiments, the control system 25 may estimate the operating parameter using Equation 6.

$$\hat{y} = F^{-1}(U(w) * G_{EST}(w))$$ Equation 6

In Equation 6, $\hat{y}$ represents an estimated operating parameter of the engine 10 (e.g., cylinder pressure), $U(w)$ is Fourier transform of the input 90 (e.g., the knock signal) and $G_{EST}(w)$ is the ETF. Therefore, in certain embodiments, the control system 25 may estimate an operating parameter by performing an inverse Fourier transform of the product of the Fourier transform of the input 90 and the ETF. In some embodiments, the control system 25 may monitor the operating parameter over one or more engine cycles to determine a location where the operating parameter is at a maximum value. The control system 25 may compare the location to a set point location (e.g., an optimal location) that enhances an efficiency of the engine 10. For example, in some embodiments, the control system 25 may determine a differential between the location and the set point location (e.g., absolute value of the difference between the location and the set point location). When the differential between the location and the set point location exceeds a threshold differential, the control system 25 may adjust an operating parameter of the engine 10. For example, the control system 25 may send a signal to adjust an engine timing map of the engine 10, an oxidant/fuel ratio, a flow of exhaust recirculation gas, a position of the intake 62 or exhaust valve 64, or another operating parameter of the engine 10 based on the differential between the location and the set point location.

Figure 4:
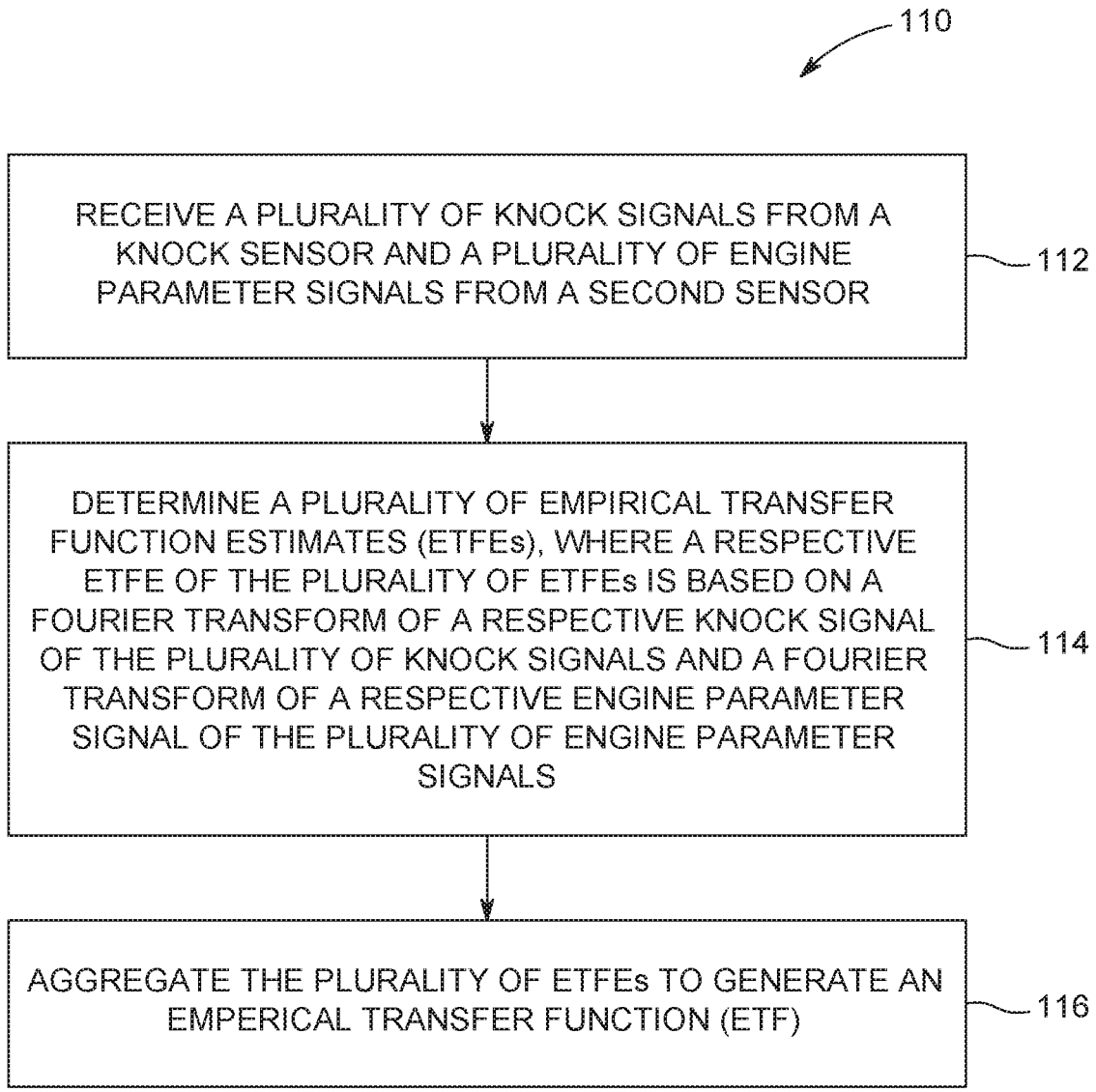
FIG. 4 is a block diagram of a process that may be utilized to train the control system of FIG. 3, in accordance with aspects of the present disclosure.

FIG. 4 is a block diagram of an embodiment of a process 110 that may be utilized to train the control system 25. As shown in the illustrated embodiment of FIG. 4, at block 112, the control system 25 may receive a plurality of knock signals from the knock sensor 23. Each knock signal of the plurality of knock signals may correspond to a cycle of the engine 10 or a portion of the cycle of the engine 10 for a variety of operating conditions (e.g., normal load, reduced load, increased load). Additionally, the control system 25 may receive a plurality of engine parameter signals (e.g., pressure signals) from a second sensor (e.g., a pressure sensor). In some embodiments, the plurality of engine parameter signals may correspond to an engine parameter indicative of an engine event to be detected (e.g., PFP). Each engine parameter of the plurality of engine parameters may correspond to a cycle of the engine 10 or a portion of the cycle of the engine 10 for a variety of operating conditions (e.g., normal load, reduced load, increased load). Therefore, the control system 25 may associate the plurality of knock signals with the plurality of engine parameter signals over an engine cycle (or a portion of an engine cycle) to determine when the knock signal corresponds to the engine event at a variety of engine operating conditions.

In order to associate the plurality of knock signals with the plurality of engine parameters, the control system 25 may further determine a plurality of ETFEs, as shown at block 114. For example, the control system 25 may determine a respective ETFE of the plurality of ETFEs by performing a Fourier transform on a respective knock signal of the plurality of knock signals and a Fourier transform on a respective engine parameter of the plurality of engine parameters. As discussed above, the control system 25 may assume a relationship between the respective knock signal and the respective engine parameter to determine a respective ETFE. In some embodiments, the assumption may be that the respective knock signal and the respective engine parameter have a linear relationship (see, e.g., Equation 1). Assuming a linear relationship between the respective knock signal and the respective engine parameter may simplify the computations performed by the control system 25, thereby reducing complexity and increasing the speed at which the control system 25 estimates a location of the engine event.

Additionally, in some embodiments, the control system 25 may assume that the relationship between the respective knock signal and the respective engine parameter is independent of time, which may further simplify the calculations performed by the control system 25. In other embodiments, the control system 25 may assume that the relationship between the respective knock signal and the respective engine parameter is dependent on time. In still further embodiments, the control system 25 may assume that the respective knock signal and the respective engine parameter have a non-linear relationship (e.g., exponential, parabolic, quadratic, logarithmic, or a combination thereof).

At block 116, the control system 25 may aggregate the plurality of ETFEs to generate the ETF by utilizing the arithmetic mean aggregation technique, the logarithmic mean aggregation technique, the quotient aggregation technique, the minimum aggregation technique, another suitable aggregation technique, or any combination thereof. Aggregating the ETFEs may enable the control system 25 to estimate a location of the engine event when the engine 10 is operating under a variety of conditions (e.g., normal loads, reduced loads, and/or increased loads).

Figure 5:
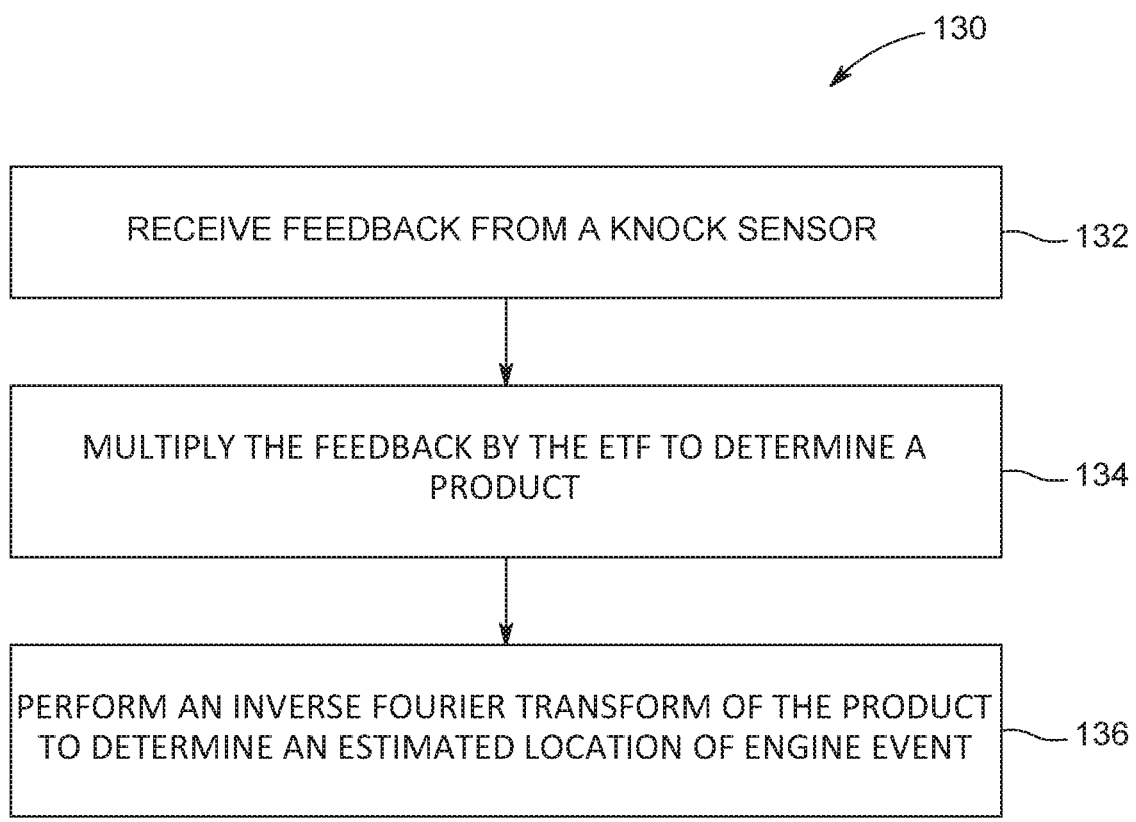
FIG. 5 is a block diagram of a process that may be utilized to estimate the location of the engine event, in accordance with aspects of the present disclosure.

For example, FIG. 5 is a block diagram of a process 130 that may be utilized to estimate a location of the engine event as the engine 10 operates to power the load 24 (e.g., when the engine 10 is operating under ordinary circumstances and/or not operating under experimental conditions). At block 132, the trained control system 25 may receive feedback from the knock sensor 23. The feedback may include a knock signal indicative of vibrations, sounds, acceleration, or another parameter of a cylinder of the engine 10. The control system 25 may ultimately utilize the feedback to estimate a location of the engine event (e.g., PFP).

For example, at block 134, the control system 25 may perform a Fourier transform on the feedback (e.g., the knock signal). Additionally, the control system 25 may multiply the Fourier transform of the feedback (e.g., the knock signal) by the ETF to receive a product. Accordingly, at block 136, the control system 25 may perform an inverse Fourier transform on the product to determine an estimate of the engine parameter, as discussed above with respect to Equation 6. By estimating the engine parameter, the control system 25 may also estimate a location of the engine event by accumulating the engine parameters over the course of an engine cycle (e.g., the control system 25 may determine a location when the engine parameter is at a maximum over the cycle).

As discussed above, upon estimation of the location of the engine event, the control system 25 may determine the differential between the location and a set point location. Further, the control system 25 may compare the differential to a threshold differential. In some embodiments, when the differential exceeds the threshold differential, the control system 25 may adjust an operating parameter of the engine 10 to enhance the efficiency of the engine 10. For example, the control system 25 may send a signal to adjust an engine timing map of the engine 10, an oxidant/fuel ratio, a flow of exhaust recirculation gas, a position of the intake 62 or exhaust valve 64, or another operating parameter of the engine 10 based on the differential between the location and the set point location.

Technical effects of the invention include receiving a signal from a knock sensor related to an engine event. The signal may be used to estimate a location of the engine event by assuming a relationship between a knock signal from the knock sensor and a parameter of an engine event. Estimating the location of the engine event using the assumed relationship may simplify computations and increase a speed at which the estimated location is determined. Additionally, operating parameters of the engine may be adjusted based on the estimated location to improve fuel efficiency, enhance power output, etc.

This written description uses examples to disclose the present embodiments, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for estimating an engine event location, comprising:
 a reciprocating engine;
 at least one knock sensor coupled to the reciprocating engine; and
 a control system for:
  receiving feedback from the at least one knock sensor;
  estimating an engine parameter of the reciprocating engine based at least on the feedback and an Empirical Transform Function (ETF);
  estimating a location of an engine event based on the engine parameter, wherein the engine event comprises a peak firing pressure of a cylinder of the reciprocating engine; and
  adjusting operation of the reciprocating engine based at least on the location of the engine event.

2. The system of claim 1, wherein the engine event comprises a closure of an exhaust valve of the reciprocating engine.

3. The system of claim 1, wherein the control system is configured to adjust an engine timing map of the reciprocating engine, an oxidant/fuel ratio of the reciprocating engine, a flow of exhaust recirculation gas of the reciprocating engine, a position of an intake or exhaust valve of the reciprocating engine, or another operating parameter of the reciprocating engine in response to the location of the peak firing pressure.

4. The system of claim 1, wherein the control system is configured to estimate the engine parameter using a processed signal, and wherein the control system is configured to process the signal by performing a Fourier transform on the signal.

5. The system of claim 4, wherein the control system is configured to multiply the processed signal by the ETF to determine a product, and wherein the control system is configured to perform a reverse Fourier transform on the product to estimate the engine parameter.

6. The system of claim 1, wherein the ETF is an aggregation of a plurality of Empirical Transfer Function Estimates (ETFEs), and wherein the plurality of ETFEs are determined based on experimental data of the reciprocating engine.

7. The system of claim 1, wherein the control system is configured to determine a differential between the location of the engine event and a set point location of the engine event, and wherein the control system is configured to adjust the operation of the reciprocating engine when the differential exceeds a threshold.

8. The system of claim 1, wherein the feedback from the at least one knock sensor is a knock signal indicative of a vibration of a cylinder of the reciprocating engine.

9. The system of claim 6, wherein, during a training mode, a respective ETFE of the plurality of ETFEs is based at least on a Fourier transform of a respective knock signal of a plurality of knock signals and on a Fourier transform of a respective engine parameter signal of a plurality of engine parameter signals.

10. A method for training a control system to estimate the location of peak firing pressure in a reciprocating engine, comprising:
 receiving a plurality of knock signals from a knock sensor coupled to the reciprocating engine;
 receiving a plurality of engine parameter signals from a second sensor of the reciprocating engine;
 determining a plurality of Empirical Transfer Function Estimates (ETFEs), wherein a respective ETFE of the plurality of ETFEs is based at least on a Fourier transform of a respective knock signal of the plurality of knock signals and on a Fourier transform of a respective engine parameter signal of the plurality of engine parameter signals; and aggregating the plurality of ETFEs to generate an Empirical Transform Function (ETF).

11. The method of claim 10, wherein aggregating the plurality of ETFEs to generate the ETF comprises using an arithmetic mean aggregation technique, a logarithmic mean aggregation technique, a quotient aggregation technique, a minimum aggregation technique, another suitable aggregation technique, or any combination thereof.

12. The method of claim 10, wherein determining a respective ETFE of the plurality of the ETFEs comprises assuming a relationship between the Fourier transform of the respective knock signal of the plurality of knock signals and the Fourier transform of the respective engine parameter of the plurality of engine parameters.

13. The method of claim 12, wherein the relationship between the Fourier transform of the respective knock signal of the plurality of knock signals and the Fourier transform of the respective engine parameter of the plurality of engine parameters is a linear relationship.

14. The method of claim 13, wherein the linear relationship between the Fourier transform of the respective knock signal of the plurality of knock signals and the Fourier transform of the respective engine parameter of the plurality of engine parameters is independent of time.

15. The method of claim 10, wherein receiving the plurality of engine parameters from the second sensor comprises receiving plurality of pressure signals from a pressure sensor disposed in a cylinder of the reciprocating engine.

16. The method of claim 10, wherein the reciprocating engine is a Waukesha VHP engine, a Jenbacher Type 4 engine, a CFR-RON engine, or any other internal reciprocating engine.

17. A system, comprising:
a reciprocating engine control system configured to:
receive a plurality of knock signals from a knock sensor coupled to the reciprocating engine;
receive a plurality of engine parameter signals from a second sensor;
determine a plurality of Empirical Transfer Function Estimates (ETFEs), wherein a respective ETFE of the plurality of ETFEs is based at least on a Fourier transform of a respective knock signal of the plurality of knock signals and on a Fourier transform of a respective engine parameter signal of the plurality of engine parameter signals;
aggregate the plurality of ETFEs to generate an Empirical Transform Function (ETF);
receive feedback from at least the knock sensor when the reciprocating engine operates to power a load;
estimate an engine parameter based at least on the feedback and the ETF;
estimate a location of an engine event corresponding based on the engine parameter; and
adjust operation of the reciprocating engine based at least on the location of the engine event.

18. The system of claim 17, wherein control system is configured to adjust operation of the reciprocating based at least on the location of the engine event by adjusting an engine timing map of the reciprocating engine, an oxidant/fuel ratio of the reciprocating engine, a flow of exhaust recirculation gas of the reciprocating engine, a position of an intake or exhaust valve of the reciprocating engine, or another operating parameter of the reciprocating engine in response to the location of the engine event.

19. The system of claim 17, wherein the control system is configured to aggregate the plurality of ETFEs to generate the ETF using an arithmetic mean aggregation technique, a logarithmic mean aggregation technique, a quotient aggregation technique, a minimum aggregation technique, another suitable aggregation technique, or any combination thereof.

20. The system of claim 17, wherein the control system is configured to determine a respective ETFE of the plurality of the ETFEs by assuming a linear relationship between the Fourier transform of the respective knock signal of the plurality of knock signals and the Fourier transform of the respective engine parameter of the plurality of engine parameters.

* * * * *